Aug. 20, 1929. C. R. STEINMETZ ET AL 1,725,487
LAWN MOWER
Filed Oct. 5, 1927 3 Sheets-Sheet 1
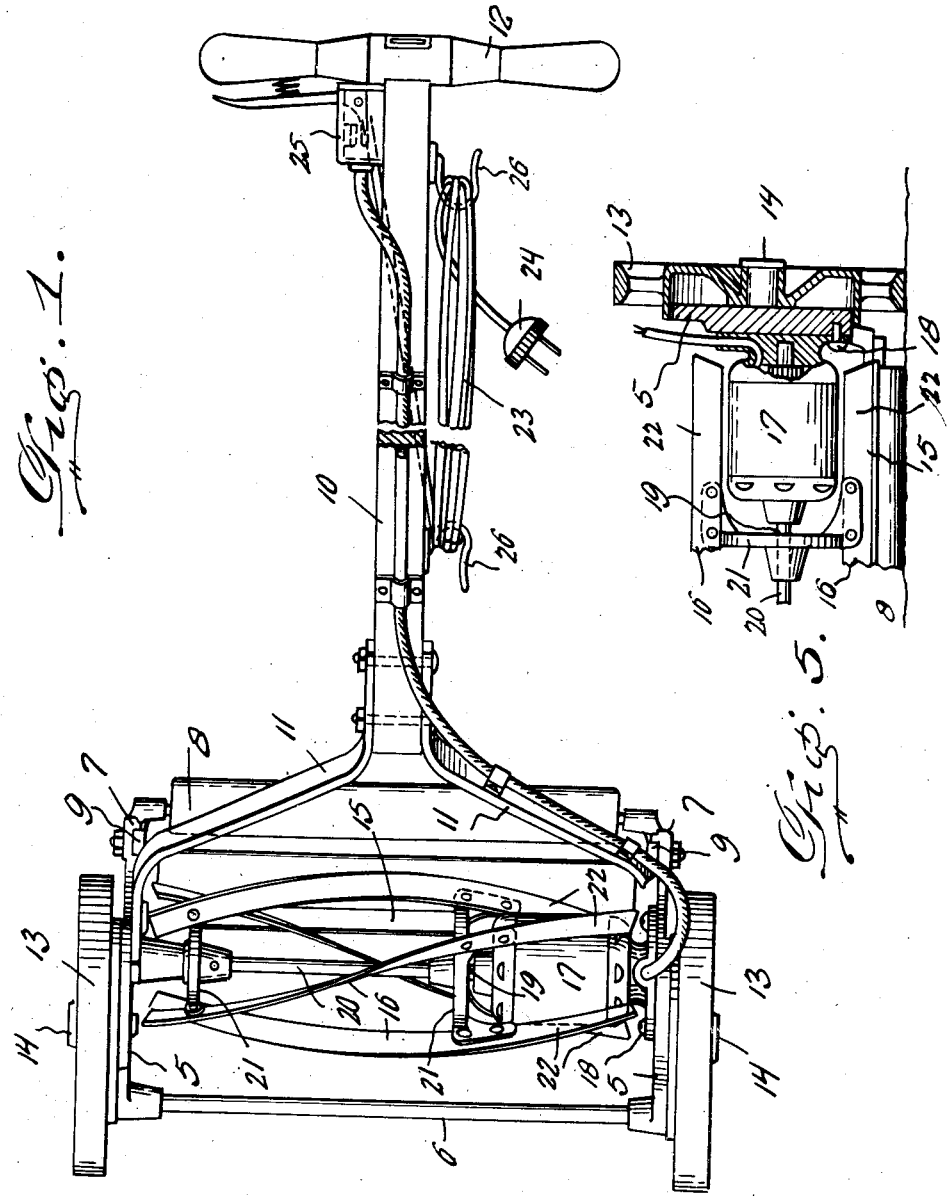
Inventors,
Charles R. Steinmetz,
Harold F. McKinney,
By J. Stanley Burch
Attorney

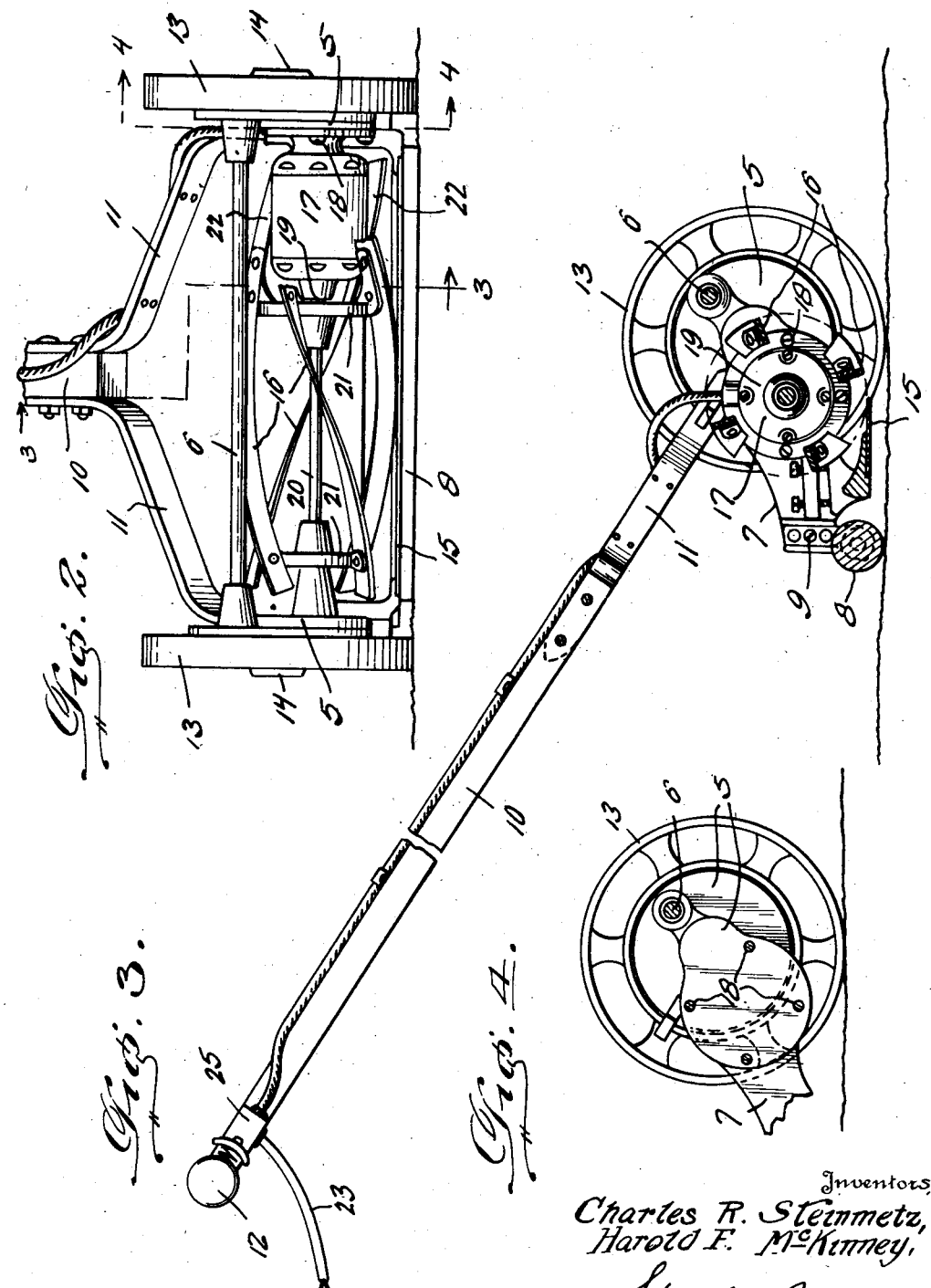

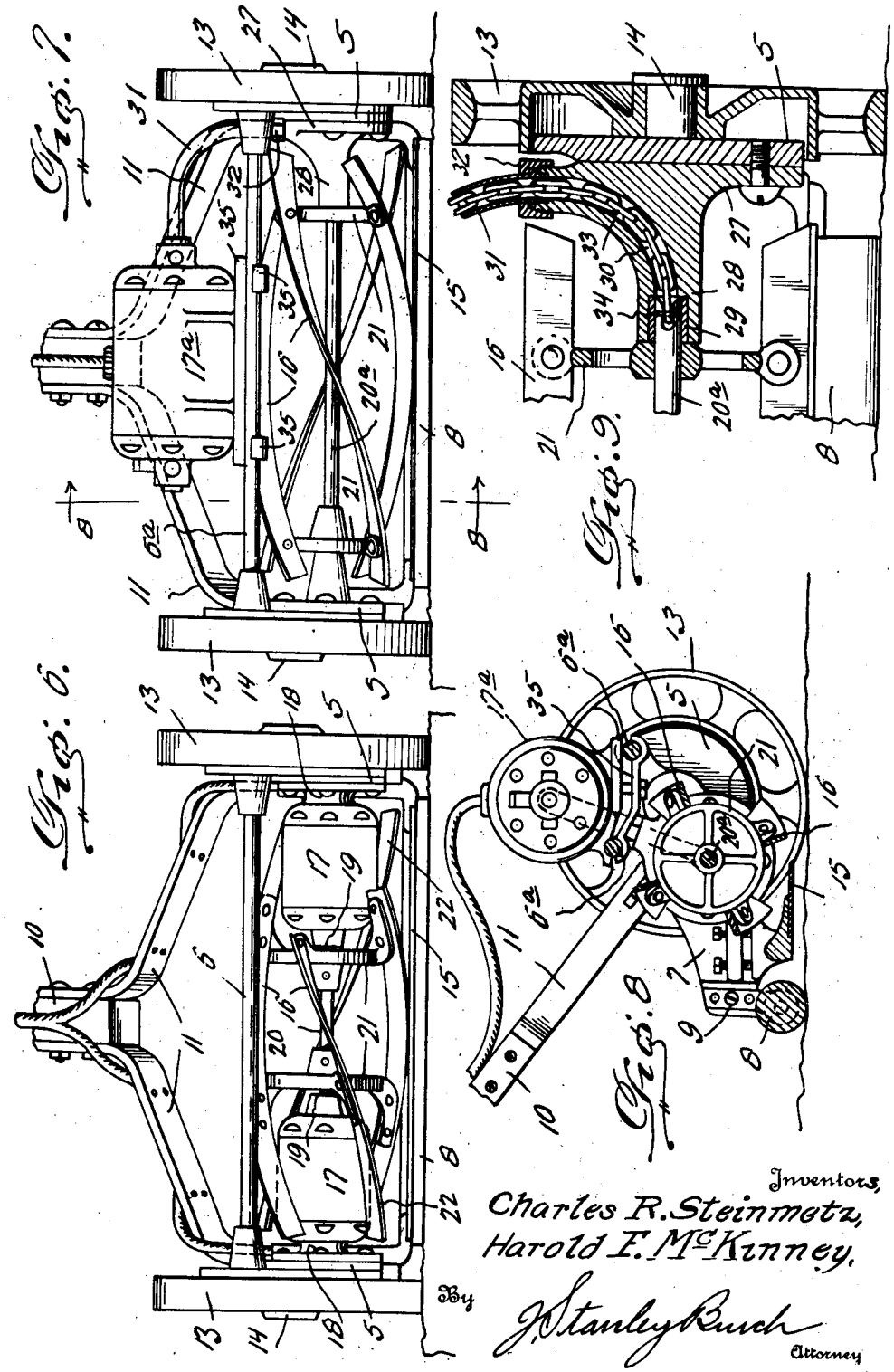

Patented Aug. 20, 1929.

1,725,487

UNITED STATES PATENT OFFICE.

CHARLES RAYMOND STEINMETZ, OF OKLAHOMA CITY, AND HAROLD FREDERICK McKINNEY, OF OKMULGEE, OKLAHOMA, ASSIGNORS TO STEINMETZ ELECTRIC LAWN MOWER COMPANY, OF OKLAHOMA CITY, OKLAHOMA, A CORPORATION.

LAWN MOWER.

Application filed October 5, 1927. Serial No. 224,086.

This invention relates to lawn mowers, and has more particular reference to mowers of that type wherein the cutting reel or cylinder is driven by a motor instead of being operated by the ground wheels.

The primary object of the present invention is to provide a mower which is simple and compact in construction, inexpensive to manufacture, and efficient in operation.

A further object is to provide an improved mower wherein the motor has direct driving connection with the cutting reel to avoid objectionable gearing between the latter and the motor.

The present invention consists in the novel form, combination and arrangement of parts hereinafter more fully described, shown in the accompanying drawings and claimed.

In the drawings:

Figure 1 is a plan view, partly broken away, of a mower embodying the present invention.

Figure 2 is a fragmentary front elevation thereof.

Figure 3 is a longitudinal section on line 3—3 of Figure 2.

Figure 4 is a section on line 4—4 of Figure 2.

Figure 5 is a fragmentary detail view, partly in front elevation and partly broken away and in section, and showing the manner of mounting the motor.

Figure 6 is a view similar to Figure 2 of a modified form of the invention.

Figure 7 is a view similar to Figure 6 of a still further form of the invention.

Figure 8 is a vertical section on line 8—8 of Figure 7, and

Figure 9 is a view similar to Figure 5 of the form of the invention shown in Figure 7.

Referring more in detail to the drawing, the present mower includes a suitable frame embodying a pair of side plates 5 rigidly connected by a transverse rod 6 and having rearward extensions 7 between which the usual gauge roller 8 is suitably mounted for vertical adjustment, as at 9. A handle 10 is also provided, having divergent arms 11 at its lower end, whose free ends are connected to the side frame plates 5 and provided at its upper rear end with a cross bar 12 whose ends are shaped to form hand grips. By this means the mower may be conveniently manually pushed and guided. Coaxial ground wheels 13 are suitably journaled on the outer sides of the frame plates 5, as at 14, and supported by the extensions 7 is an adjustable ground knife 15 adapted to cooperate with the spiral blades 16 of the cutting reel in a well known manner.

In the form of the invention shown in Figures 1 to 5 inclusive, an electric motor 17 is mounted at one end, as at 18, on the inner side of one frame plate 5 and has its drive or armature shaft 19 coaxial with the shaft 20 of the cutter reel or cylinder. The motor shaft is preferably rigid with the reel shaft, and the blades 16 of the reel are preferably carried by spaced disks or spiders 21 secured on the shaft 20. As shown, the blades 16 project, as at 22, in surrounding relation to the motor so that the motor is substantially housed or mounted within one end of the cutting reel, the latter extending the full width of the frame for giving a cut of corresponding width. In view of the above, the weight of the motor is not placed outside the frame, and objectionable gearing between the reel and motor is avoided.

Current may be supplied to the motor by the use of an attachment cord 23 having an attachment plug 24 at one end for connection with a suitable source of current supply, the operation of the motor being effected by manipulation of the handle of a suitable normally open switch 25, which handle is actuated by the hand gripping an end of the cross bar 12. Hooks 26 may be provided on the mower handle 10 about which the cord 23 may be wound when not in use.

The form of the invention shown in Figure 6 is the same as in Figures 1 to 5 inclusive, except that a motor 17 is mounted at the inner side of both frame plates 5 and connected to the reel shaft. In this way, a better balanced construction is had and additional power is furnished for driving the reel. The latter is of importance where the diameter of the reel is so small as to require the use of small motors.

In the form of the invention shown in Figures 7 to 9 inclusive, a special mounting plate 27 is secured on the inner side of one of the frame plates 5, and this mounting plate has an inwardly projecting hollow part 28 provided with a bearing 29 in which the adjacent end of the reel shaft 20ª is journaled. The plate 27 has a bore or passage 30 which extends outwardly and upwardly from the bearing 29 and opens through the top of the plate 27 where one end of a rigid curved conduit 31 is coupled thereto, as at 32. The other end of conduit 31 is coupled to an end of the housing of a motor 17ª which has a flexible drive shaft 33, of any well-known or preferred construction, that is extended through conduit 31 and bore 30 and that has an end coaxial with and coupled, as at 34, to the adjacent end of reel shaft 20ª. The motor 17ª is rigidly mounted or clamped in a suitable manner, as at 35, upon a pair of transverse rods 6ª connecting the side frame plates 5 above the reel.

What we claim is:—

1. In a mower, the combination of a frame, a cutting reel journaled in the frame and having a shaft, and a motor mounted within and at one side of the frame, said motor having a shaft coaxial and rigid with the shaft of the cutting reel, said motor being mounted within one end of the cutting reel.

2. In a mower, the combination of a cutting reel having a shaft, and a pair of motors whose shafts are operatively connected to and coaxial with that of the cutting reel, said motors being mounted within opposite ends of the cutting reel.

In testimony whereof we affix our signatures.

CHARLES RAYMOND STEINMETZ.
HAROLD FREDERICK McKINNEY.